(12) United States Patent
Chu et al.

(10) Patent No.: US 12,742,485 B2
(45) Date of Patent: Sep. 22, 2026

(54) CANNED VALVE SEAL

(71) Applicant: Fox Factory, Inc., Duluth, GA (US)

(72) Inventors: Season Chu, Tai-Chung (TW); Thomas Holaday, Arden, NC (US); Joshua Coaplen, Asheville, NC (US); William O. Brown, IV, Aptos, CA (US)

(73) Assignee: Fox Factory, Inc., Duluth, GA (US)

( * ) Notice: Subject to any disclaimer, the term of this patent is extended or adjusted under 35 U.S.C. 154(b) by 0 days.

(21) Appl. No.: 18/582,468

(22) Filed: Feb. 20, 2024

(65) Prior Publication Data

US 2025/0264145 A1 Aug. 21, 2025

(51) Int. Cl.
*F16F 9/34* (2006.01)
*F16K 1/46* (2006.01)

(52) U.S. Cl.
CPC ........ *F16F 9/3405* (2013.01); *B60G 2202/41* (2013.01); *F16K 1/46* (2013.01)

(58) Field of Classification Search
CPC .... F16F 9/0272; F16F 9/3405; B60G 2202/41
See application file for complete search history.

(56) References Cited

U.S. PATENT DOCUMENTS 4,949,941 A * 8/1990 Bauer .................. F16F 9/0272 188/300
5,116,028 A * 5/1992 Mintgen .............. F16F 9/0272 188/300
6,296,092 B1 10/2001 Marking et al.
10,036,443 B2 7/2018 Galasso et al.
10,576,803 B2 * 3/2020 Marking ................ F16F 9/346
2015/0232142 A1 * 8/2015 Shirai .................... B62K 19/36 403/104
2023/0322319 A1 * 10/2023 Staples ...................... B62J 1/06
2023/0348004 A1 * 11/2023 Staples ...................... B62J 1/08

* cited by examiner

*Primary Examiner* — Thomas E Lazo

(57) ABSTRACT

A canned valve seal is disclosed. The valve seal is used within a gland formed in a piston body, the valve seal providing a fluid seal between the body and a valve when the valve is in a closed position, the valve seal includes a stiff component and a sealing material about the stiff component.

19 Claims, 7 Drawing Sheets

CANNED VALVE SEAL

FIELD OF THE INVENTION

Embodiments of the invention generally relate to telescopic assemblies.

BACKGROUND

In many telescopic assemblies, the fluid flow through the piston is used to control some of the performance characteristics. Often, a flow path will be provided through the piston body and a valve will be used to control the fluid flow therethrough. Because of the required movement between the valve and the piston body a seal is used to provide a fluid seal when the valve is in a closed position.

Often, the seal is an O-ring. However, O-rings have operational ranges, such as pressure differentials and the like, that can cause detrimental operation. For example, in some pressure differential environments, the initial opening of the valve will cause the O-ring to flutter, make noise, become damaged, be partially and/or entirely displaced from its installed location, and the like.

In one embodiment, the noise sounds like a "honk". In one embodiment, the sound is loud enough to be heard by the rider and/or people nearby. In one embodiment, the fluttering can be felt by the rider, such as being transmitted by the pedals, handlebars, etc. In one embodiment, this noise and/or fluttering can continue to occur if the valve is held in a partially opened position instead of being fully opened.

For example, when there is an increases in the pressure (or a pressure imbalance) between the fluid in two chambers between the piston, the opening of the valve will initiate a high velocity flow as the higher pressure fluid moves through the piston flow path. In one embodiment, the high velocity flow will cause a low-pressure zone around the O-ring. This low-pressure zone will create a "suction effect" attempting to pull the O-ring radially inward. Additionally, under certain conditions, high velocity flow of fluid will impact the "backside" or "gland-facing" side of the O-ring and essentially "wash" or "blow" the O-ring out of position. Furthermore, the "suction effect" and the "wash"/"blow" effect may act together.

In a deleterious situation, when the O-ring is pulled completely out of its proper location, fluid will continue to at least partially flow unencumbered through the piston flow path regardless of the state of the valve. In other words, the telescoping assembly will no longer be functionally operable.

BRIEF DESCRIPTION OF THE DRAWINGS

Aspects of the present invention are illustrated by way of example, and not by way of limitation, in the accompanying drawings, wherein.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention is to be practiced. Each embodiment described in this disclosure is provided merely as an example or illustration of the present invention, and should not necessarily be construed as preferred or advantageous over other embodiments. In some instances, well known methods, procedures, and objects have not been described in detail as not to unnecessarily obscure aspects of the present disclosure.

In general, a suspension system for a vehicle provides a motion modifiable connection between a portion of the vehicle that is in contact with a surface (e.g., an unsprung portion) and some or all of the rest of the vehicle that is not in contact with the surface (e.g., a suspended portion). For example, the unsprung portion of the vehicle that is in contact with the surface can include one or more wheel(s), skis, tracks, hulls, etc., while some or all of the rest of the vehicle that is not in contact with the surface include suspended portions such as a frame, a seat, handlebars, engines, cranks, etc.

The suspension system will include one or numerous components which are used to couple the unsprung portion of the vehicle (e.g., wheels, skids, wings, etc.) with the suspended portion of the vehicle (e.g., seat, cockpit, passenger area, cargo area, etc.). Often, the suspension system will include one or more telescopic assemblies which are used to reduce feedback from the unsprung portion of the vehicle before that feedback is transferred to the suspended portion of the vehicle, as the vehicle traverses an environment. However, the language used by those of ordinary skill in the art to identify a telescopic assembly used within the suspension system can differ while referring to the same (or similar) types of components. For example, some of those of ordinary skill in the art will refer to a telescopic assembly as a shock absorber (or shock assembly etc.), while others of ordinary skill in the art will refer to the telescopic assembly as a damper (or damper assembly).

Figure 1:
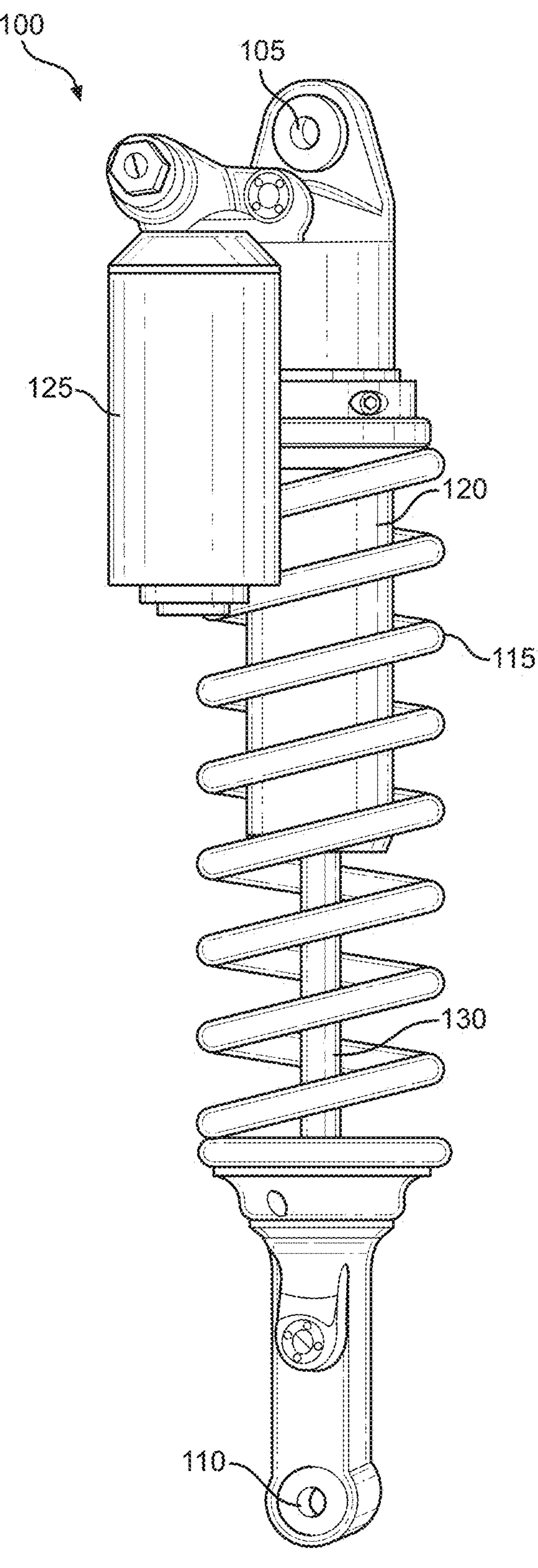
FIG. 1 is a perspective view of a shock assembly, in accordance with an embodiment.

One example of a particular telescopic assembly is provided in FIG. 1. In FIG. 1, a perspective view of telescopic assembly 100 comprising a shock assembly is shown wherein the shock assembly includes eyelets 105 and 110, damper housing 120, helical spring 115, piston shaft 130, and piggyback (or external reservoir 125).

However, the telescopic assembly disclosed herein is not limited to "shock assemblies" or to use as a vehicle suspension. The telescopic assemblies of the present embodiments may be used, for example, with a screen door (or the like) to reduce the speed of closure and/or return an open door to a closed position. In another embodiment, the telescopic assembly may be used to hold the hood of a vehicle, the trunk of a car, etc. in an open position. In another embodiment, the telescopic assembly is used in a hold, release, and return configuration such as a dropper seatpost. In another embodiment, the telescopic assembly is used on a suspension inclusive device such as, but not limited to an exoskeleton, a seat frame, a prosthetic, an orthotic, a suspended floor, and the like.

Embodiments of the present invention are well suited to any environment where a telescopic assembly is beneficial for energy storage and/or dissipation.

Figure 2:
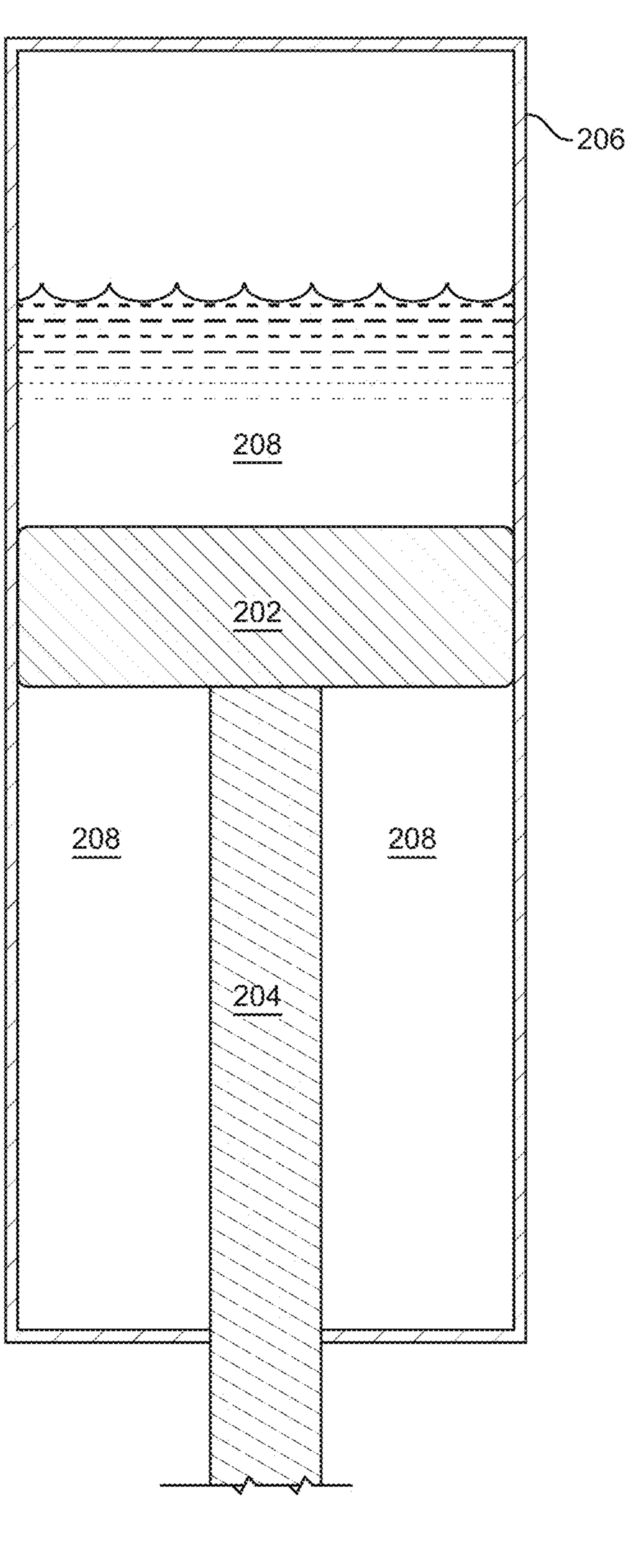
FIG. 2 is a schematic depiction of a telescopic assembly, in accordance with an embodiment.

Referring now to FIG. 2, a telescopic assembly often comprises a (damping) piston 202 and a piston shaft 204 telescopically mounted in a fluid filled cylinder (e.g., a chamber 206). The fluid 208 (e.g., damping fluid, working fluid, etc.) may be, for example, a hydraulic oil, a gas such as nitrogen, air, or the like. In one embodiment, the adjustable telescopic assembly will include a mechanical spring, such as helical spring 115, that surrounds or is mounted in parallel with the body of the adjustable telescopic assembly. In one embodiment, the telescopic assembly will include an air spring instead of a helical spring 115. In one embodiment, the telescopic assembly will include both a helical spring 115 and an air spring.

In telescopic assemblies that do not have a through shaft, the available fluid volume within a chamber 206 changes as the shaft 204 moves in and out of the chamber 206. For example, the maximum amount of working fluid which can be held within the chamber 206 is limited by the shaft 204. In other words, when the telescopic assembly is completely compressed and the shaft 204 is taking up its maximum volume within the chamber 206, the remaining fluid volume can be filled with the working fluid. As such, when the shaft 204 is at least partially withdrawn from the chamber 206, the reduction in shaft volume within the chamber 206 results in an increase in the amount of available fluid volume within the chamber 206. In a most basic telescopic assembly, that space is filled with a gas such as, but not limited to, air. For purposes of brevity and clarity, the present discussion will refer to the gas as air. Deleteriously, during operation of the telescopic assembly the motion of the piston 202 within the chamber 206 can incorporate the air into the working fluid to form what is often referred to as an emulsion. Basically, when an emulsion is created in chamber 206, rather than the piston 202 interacting solely with non-compressible working fluid, the piston 202 is instead interacting with a combination of compressible air and the working fluid (i.e., the emulsion). During such a condition, the piston 202 experiences reduced resistance to movement through the chamber 206 thereby resulting in a reduced damping response.

For additional detail and description of a shock absorber/damper including components and operation, see, as an example, U.S. Pat. Nos. 6,296,092; 10,576,803; and 10,036,443 the contents of which are incorporated by reference herein, in their entirety.

Figure 3A:
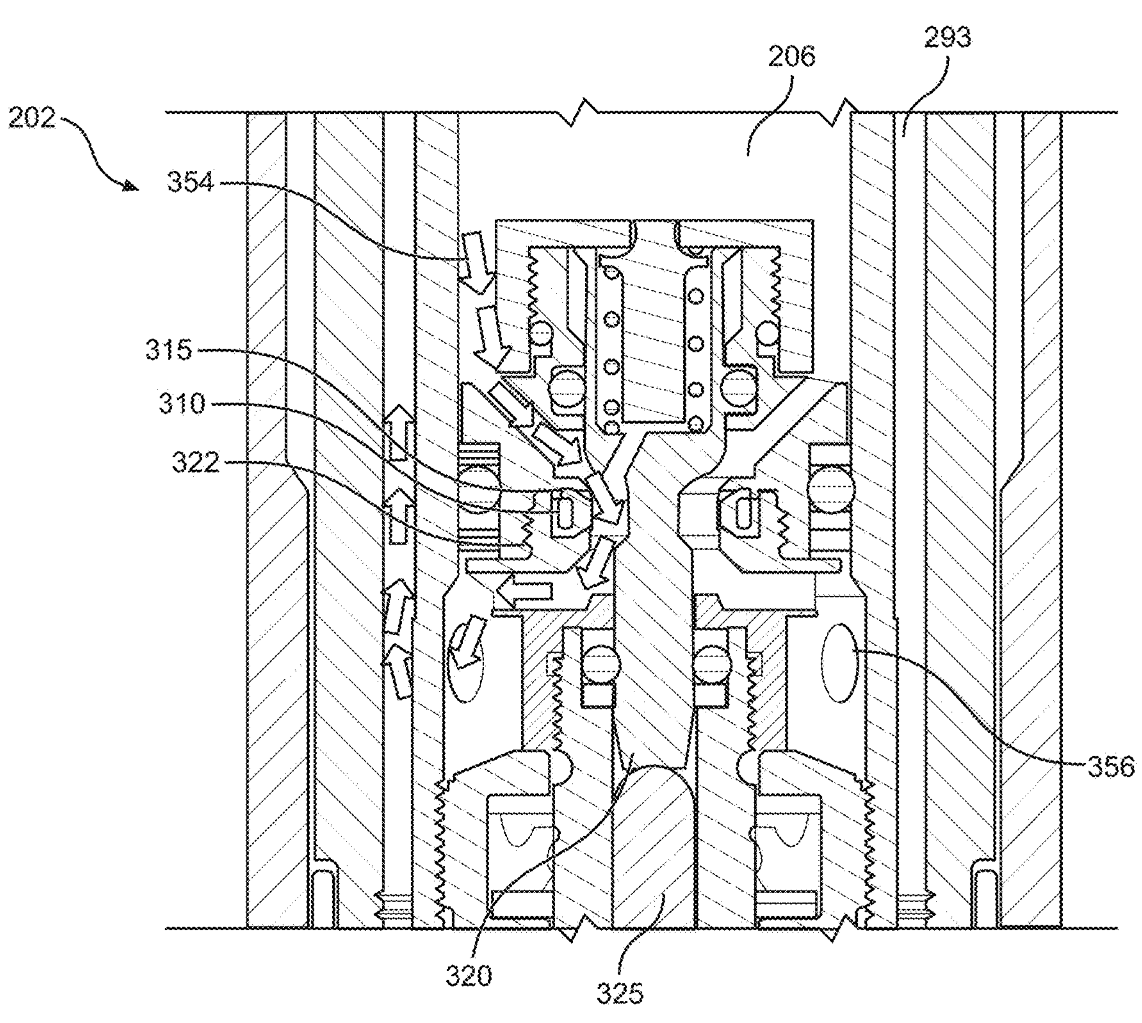
FIG. 3A is a section view of the valve seal between the body and a valve, in accordance with an embodiment.

With reference now to FIG. 3A, a section view of a valve seal 310 between a piston body 322 and a valve 320 of a piston 202 is shown in accordance with an embodiment.

In general, piston 202 will include at least one flow path 354 therethrough. This fluid pathway allows the fluid to move from one side of piston 202 to the other as the piston 202 moves within the chamber 206. In one embodiment, the fluid will move from one side of chamber 206 to the other where the sides are separated by piston 202. In other embodiments, the fluid will move between chamber 206 and another chamber 293 via the flow path 354 of piston 202. By setting and/or controlling the flow rate of the fluid through the flow path 354, the damping characteristics and/or actual operation of the telescopic assembly 100 can be set and/or modified.

Figure 4A:
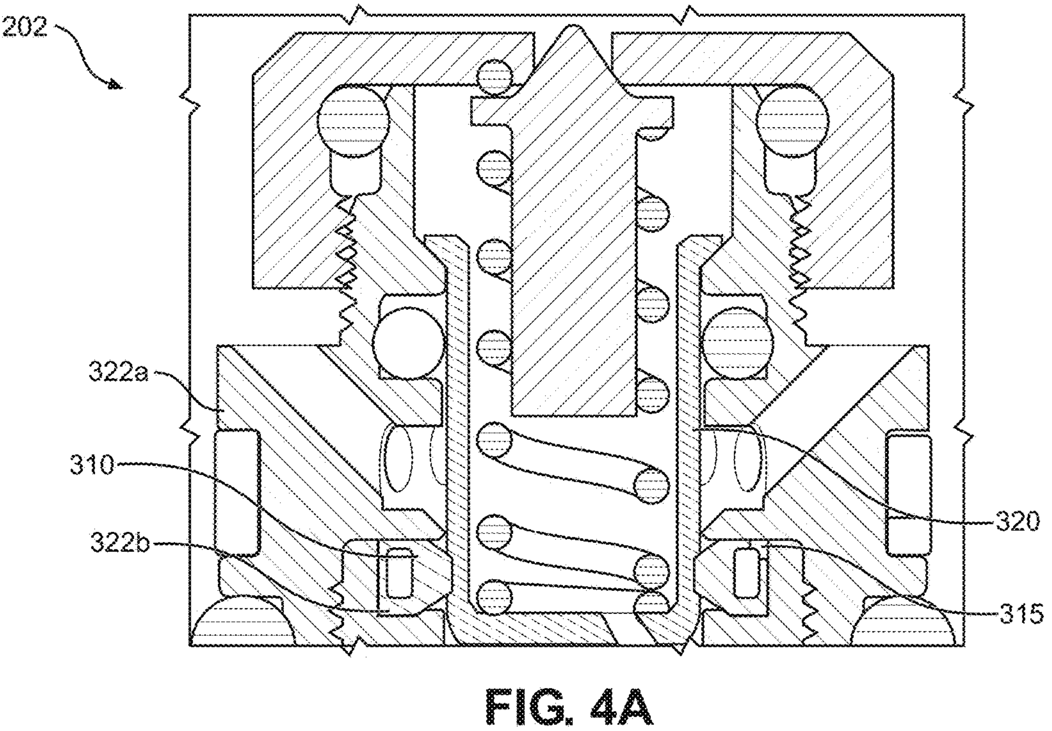
FIG. 4A is a section view of the valve seal between the body and the valve, in accordance with an embodiment.

Sometimes, such as in a dropper seat post, or the like, it is important to be able to control the opening and closing of the flow path 354. For example, when the dropper seatpost is extended, it is held in its extended position by closing the flow path 354. This is accomplished, in one embodiment, by moving valve 320 with respect to the piston body 322 such that the flow path 354 is blocked (as shown in FIG. 4A). In so doing, the dropper seatpost will not compress while the valve 320 is in the closed position.

If the user would like to lower the dropper seatpost, the user would activate a component to move the valve 320 with respect to the piston body 322 such that the flow path 354 is opened. When the valve 320 is in the open position (as shown in FIG. 3A), the fluid 208 can flow through flow path 354 of piston 202 which will allow the piston to move further into chamber 206 causing the telescopic assembly 100 to compress and thus, the dropper seatpost to drop.

In one embodiment, an adjuster rod 325 (or the like) is used to open or close valve 320.

In one embodiment, valve 320 is a spool valve. However, it should be appreciated that in another embodiment, the valve may be another type of valve such as a poppet valve, or the like. A spool valve is shown as one embodiment and for purposes of clarity.

In one embodiment, the valve seal 310 provides a fluid seal between piston body 322 and the valve 320. When valve 320 is closed (or seated) valve seal 310 seals any fluid flow between valve 320 and piston body 322. In contrast, when valve 320 is in an open position, or no longer seated, flow path 354 is opened and fluid 208 can flow through port 356 between chambers 206 and/or 293.

Figure 3B:
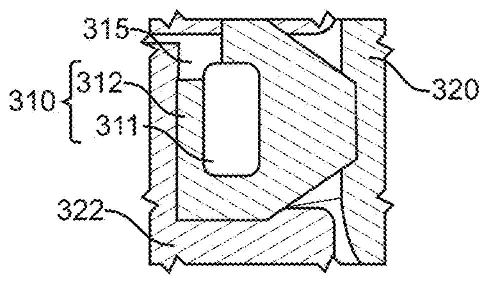
FIG. 3B is a section view of the valve seal between the body and the valve, in accordance with an embodiment.
Figure 3C:
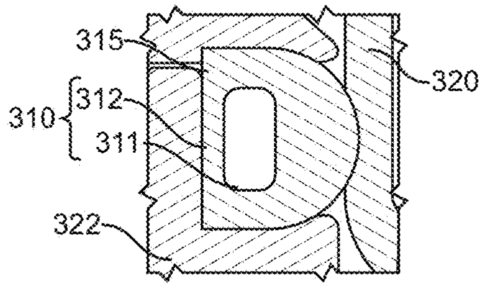
FIG. 3C is a side cutaway view of the valve seal between the body and the valve, in accordance with an embodiment.

With reference now to FIG. 3B, a section view of the valve seal 310 between the piston body 322 and the valve 320 is shown in accordance with an embodiment. In FIG. 3C, a side cutaway view of the valve seal 310 between the piston body 322 and the valve 320 is shown in accordance with an embodiment. For purposes of clarity, the components and/or functionality of FIGS. 3B and 3C that are the same or similar to the components and/or functionality already described in FIG. 3A are not repeated, but instead the entirety of any components and/or functionality discussions provided herein is incorporated by reference.

In one embodiment, valve seal 310 includes a sealing material 312 and a stiff component 311 therein. In general, the stiff component 311 will hold or retain the valve seal 310 within gland 315. That is, the stiff component 311 provides rigidity to the sealing material 312 of the valve seal 310 such that valve seal 310 will remain within gland 315 regardless of the velocity of fluid 208 (e.g., oil, hydraulic fluid, etc.) flowing next to valve seal 310. In one embodiment, stiff component 311 is selected from one or more various materials, such as, but not limited to: a metal alloy, steel, aluminum, titanium, ceramic, plastic, a composite material, and carbon fiber, and the like. Basically, the stiff component 311 has a higher modulus of elasticity than the sealing material 312 of the valve seal 310.

In one embodiment, the sealing material 312 is over molded about stiff component 311 to form the valve seal 310. In one embodiment, the sealing material 312 is selected from one or more various materials such as, but not limited to: polymer, silicon, rubber, polytetrafluoroethylene (PTFE), an elastomer, nitrile butadiene rubber (NBR), or the like.

In one embodiment, the sealing material 312 has a portion missing from a portion thereof. In one embodiment, the sealing material 312 does not have a portion missing and the stiff component 311 is completely encased by sealing material 312.

In one embodiment, the sealing material 312 of valve seal 310 is formed into a shape wherein the valve seal 310 has a cross-sectional profile with a geometric shape such as, for example, a trapezoid as shown in FIG. 3B and/or a D-profile as shown in FIG. 3C. By forming valve seal 310 with such a geometric shape, retention of valve seal 310 within gland 315 is improved. In one embodiment, the sealing material 312 is formed into a shape wherein the valve seal 310 has a cross-sectional profile with a geometric shape such as, for example, a circle, star, square, diamond, D-shaped, rectangular, trapezoidal, etc.

In one embodiment, valve seal 310 is over molded directly into the gland 315. In one embodiment, valve seal 310 that is over molded directly into the gland 315 does not include stiff component 311. In one embodiment, valve seal 310 including stiff component 311, is over molded directly into the gland 315.

With reference now to FIG. 4A, a section view of the valve seal 310 between the piston body 322 and the valve 320 is shown in accordance with an embodiment. For purposes of clarity, the components and/or functionality of FIG. 4A that are the same or similar to the components and/or functionality already described in FIGS. 3A-3C are not repeated, but instead the entirety of any components and/or functionality discussions provided herein is incorporated by reference.

In one embodiment, the portion of piston body 322 that forms gland 315 is a single piece. In one embodiment, as shown in FIG. 4A, the portion of piston body 322 that forms gland 315 is made up of more than one piece. In one embodiment, the portion of piston body 322 that forms gland 315 is made up of two pieces, e.g., 322*a* and 322*b*. In one embodiment, the portion of piston body 322 that forms gland 315 is made up of more than two pieces.

In one embodiment, body pieces 322*a* and 322*b* are threadedly coupled to form the gland 315 of piston body 322. In one embodiment, there is some type of thread sealer or the like used to provide a fluid seal when body pieces 322*a* and 322*b* are threadedly engaged.

In one embodiment, valve seal 310 is placed within gland 315 and the body pieces 322*a* and 322*b* are threadedly engaged to hold valve seal 310 within gland 315. In one embodiment, by providing a multi-piece gland 315 section of piston body 322, the valve seal 310 that includes stiff component 311 is able to be placed in position within the gland 315 before the placement of valve 320 (or without having to force valve seal 310 about valve 320 which could deleteriously damage the valve seal 310). In so doing assembly, disassembly, and maintenance is significantly reduced in complexity.

Figure 4B:
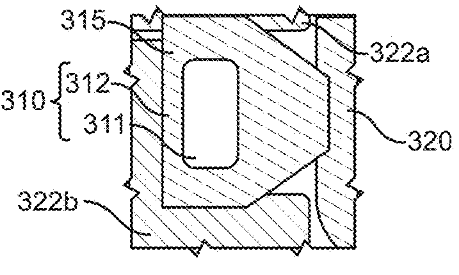
FIG. 4B is a section view of the valve seal between the multi part body and the valve, in accordance with an embodiment.
Figure 4B:
Figure 4C:
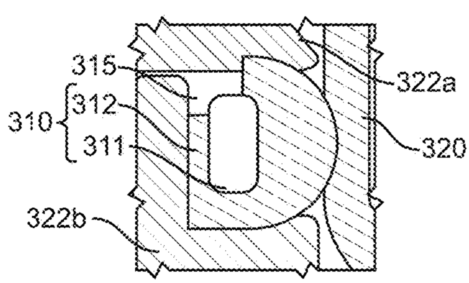
FIG. 4C is a section view of the valve seal between the multi part body and the valve, in accordance with an embodiment.
Figure 4D:
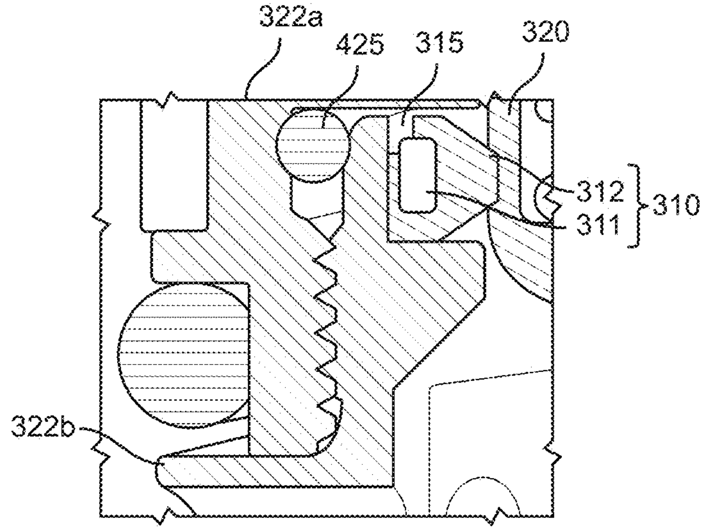
FIG. 4D is a section view of the valve seal between the multi part body an O-ring and the valve, in accordance with an embodiment.
Figure 4E:
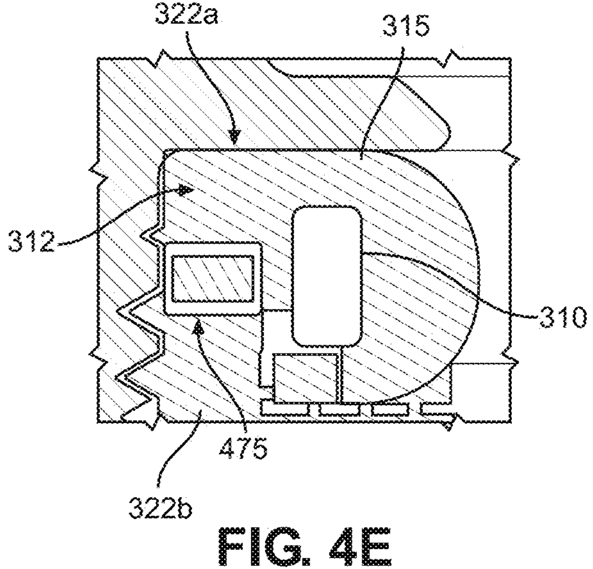
FIG. 4E is a section view of the valve seal between the multi part body and the valve, in accordance with an embodiment.

With reference now to FIG. 4B, a section view of the valve seal 310 between the multi part piston body 322 and the valve 320 is shown in accordance with an embodiment. In FIG. 4C, a section view of the valve seal 310 between the multi part piston body 322 and the valve 320 is shown in accordance with an embodiment. With reference now to FIG. 4D, a section view of the valve seal 310 between the multi part piston body 322 an O-ring 425 and the valve 320 is shown in accordance with an embodiment. In FIG. 4E, a section view of the valve seal 310 between the multi part piston body 322 and the valve 320 is shown in accordance with an embodiment. For purposes of clarity, the components and/or functionality of FIGS. 4B-4E that are the same or similar to the components and/or functionality already described in FIGS. 3A-4A are not repeated, but instead the entirety of any components and/or functionality discussions provided herein is incorporated by reference.

In one embodiment, the sealing material 312 is over molded about stiff component 311 to form the valve seal 310. In one embodiment, the sealing material 312 is formed into a geometric shape such as a trapezoid as shown in FIG. 4B and/or a D-profile as shown in FIG. 4C. In one embodiment, the sealing material 312 is formed into a different geometric shape such as a circle, star, square, diamond, D-shaped, rectangular, trapezoidal, etc.

In one embodiment, as shown in FIGS. 4B and 4C, the sealing material 312 over molded about stiff component 311 to form the valve seal 310 is wide enough such that during assembly of the body pieces 322*a* and 322*b* to form the gland 315 of piston body 322, the upper and lower body pieces 322*a* and 322*b* of the gland 315 squeeze the valve seal 310 causing valve seal 310 to provide both a radial and axial seal. In other words, the squeezed valve seal 310 will provide a fluid seal for the threads of body pieces 322*a* and 322*b* there behind.

In one embodiment, the geometric shape of the valve 320 facing portion of valve seal 310 is modified to ensure when the valve seal 310 is squeezed by the threading of body pieces 322*a* and 322*b* there is not too much material being pressed into the area forming the seal with the valve 320. In so doing, when valve 320 is opened the valve seal 310 will not overtake the area (or otherwise deleteriously fill the void of the opened valve 320) thereby causing a closing issue when the valve spring 715 presses the valve 320 back into its closed position.

With reference again to FIG. 4D, in one embodiment instead of the upper and lower body pieces 322*a* and 322*b* of the gland 315 squeezing the valve seal 310 and cause valve seal 310 to provide both a radial and axial seal an O-ring 425 (or sealant, tape, etc.) is used to fluidly seal the threads such that valve seal 310 is not squeezed and as such will not deleteriously fill the void of the opened valve 320. In one embodiment, the O-ring 425 (or sealant, tape, etc.) is used in conjunction with the squeezing of the valve seal 310 as shown in FIGS. 4B and 4C.

FIG. 4E, shows one embodiment where only a portion of the valve seal 310 is squeezed while the remainder of the valve seal 310 is not. For example, in one embodiment, the upper and lower body pieces 322*a* and 322*b* of the gland 315 squeeze the rear portion 475 of the valve seal 310 and cause the rear of the valve seal 310 to fluidly seal the threads of body pieces 322*a* and 322*b*. At the same time, the front (or valve facing portion) of valve seal 310 is not squeezed and, as such, will not deleteriously fill the void caused by the opening of valve 320. In one embodiment, the O-ring 425 (or sealant, tape, etc.) of FIG. 4D is used in conjunction with the squeezing of the valve seal 310 as shown in FIG. 4E.

Figure 5:
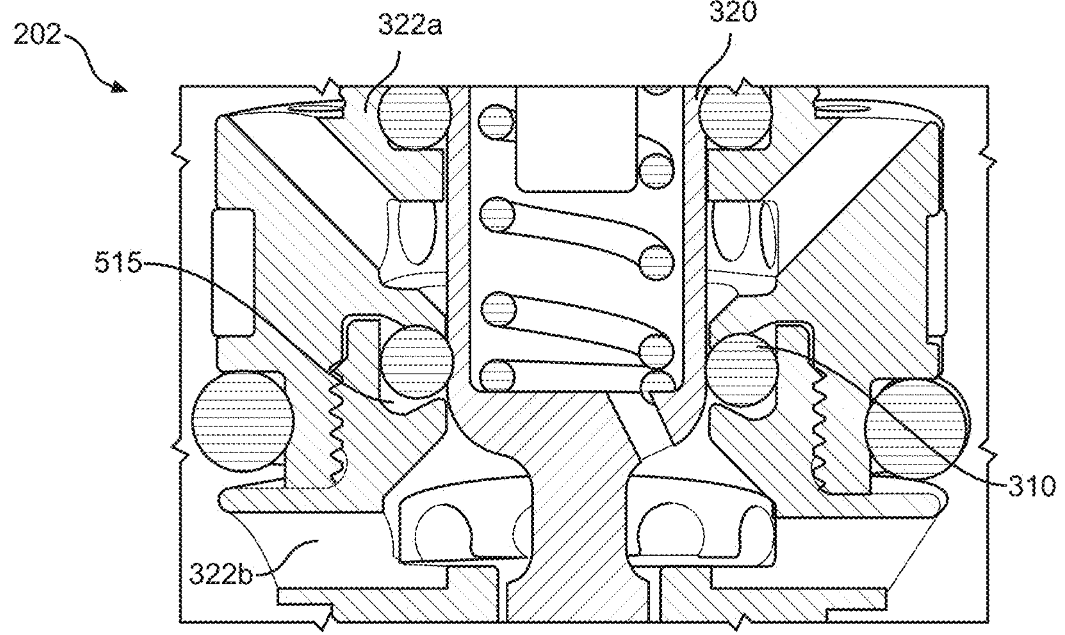
FIG. 5 is a section view of the valve seal between the body and the valve, in accordance with an embodiment.

With reference now to FIG. 5, a section view of the valve seal 310 between the piston body 322 and the valve 320 is shown in accordance with an embodiment. For purposes of clarity, the components and/or functionality of FIG. 5 that are the same or similar to the components and/or functionality already described in FIGS. 3A-4E are not repeated, but instead the entirety of any components and/or functionality discussions provided herein is incorporated by reference.

In one embodiment, the portion of piston body 322 that forms gland 515 is a single piece. In one embodiment, the portion of piston body 322 that forms gland 515 is made up of more than one piece. In one embodiment, the portion of piston body 322 that forms gland 515 is made up of two pieces, e.g., 322*a* and 322*b*. In one embodiment, the portion of piston body 322 that forms gland 515 is made up of more than two pieces.

In one embodiment, gland 515 of piston body 322 is formed with a dovetail shape to trap the valve seal 310 within the gland 515 and stop the valve seal 310 from making noise, fluttering, and/or being pulled from gland 515 during high velocity flow events.

In one embodiment, the O-ring 425 (or sealant, tape, etc.) of FIG. 4D is used in conjunction with the dovetail gland 515. In one embodiment, the squeezing of the valve seal 310 as shown in FIGS. 4B, 4C, and/or 4E is used in conjunction with the dovetail gland 515. In one embodiment, the O-ring 425 (or sealant, tape, etc.) of FIG. 4D and the squeezing of the valve seal 310 as shown in FIGS. 4B, 4C, and/or 4E is used in conjunction with the dovetail gland 515.

Figure 6:
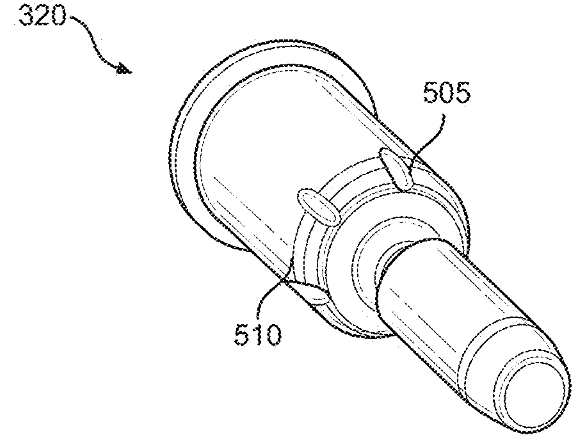
FIG. 6 is a perspective view of the valve with features in a face thereof, in accordance with an embodiment.

With reference now to FIG. 6, a perspective view of the valve 320 with features in a face thereof is shown in accordance with an embodiment. For purposes of clarity, the components and/or functionality of the valve 320 of FIG. 6 that are the same or similar to the components and/or functionality already described in FIGS. 3A-5 are not repeated, but instead the entirety of any components and/or functionality discussions provided herein is incorporated by reference.

In one embodiment, valve 320 includes at least one groove in a face thereof. In one embodiment, the groove is a horizontal groove 510 and/or a vertical groove 505. In one embodiment the horizontal groove 510 and/or a vertical groove 505 creates an initial pathway for pressure release when the valve 320 is initially opened to the high velocity fluid flow by providing an opening (e.g., the groove) while allowing the valve seal 310 to remain in contact with (and be supported by) the valve 320 such that it does not make noise, vibrate or be deleteriously pulled from the gland 315 within which it resides.

In one embodiment, the groove in the face of the valve 320 is used in conjunction with O-ring 425 (or sealant, tape, etc.) of FIG. 4D. In one embodiment, groove in the face of the valve 320 is used in conjunction with the dovetail gland 515 of FIG. 5. In one embodiment, the groove in the face of the valve 320 is used in conjunction with the squeezing of the valve seal 310 as shown in FIGS. 4B, 4C, and/or 4E. In one embodiment, the groove in the face of the valve 320 is used in conjunction with the O-ring 425 (or sealant, tape, etc.) of FIG. 4D, the squeezing of the valve seal 310 as shown in FIGS. 4B, 4C, and/or 4E, and/or the dovetail gland 515 of FIG. 5.

Figures 7A, 7B:
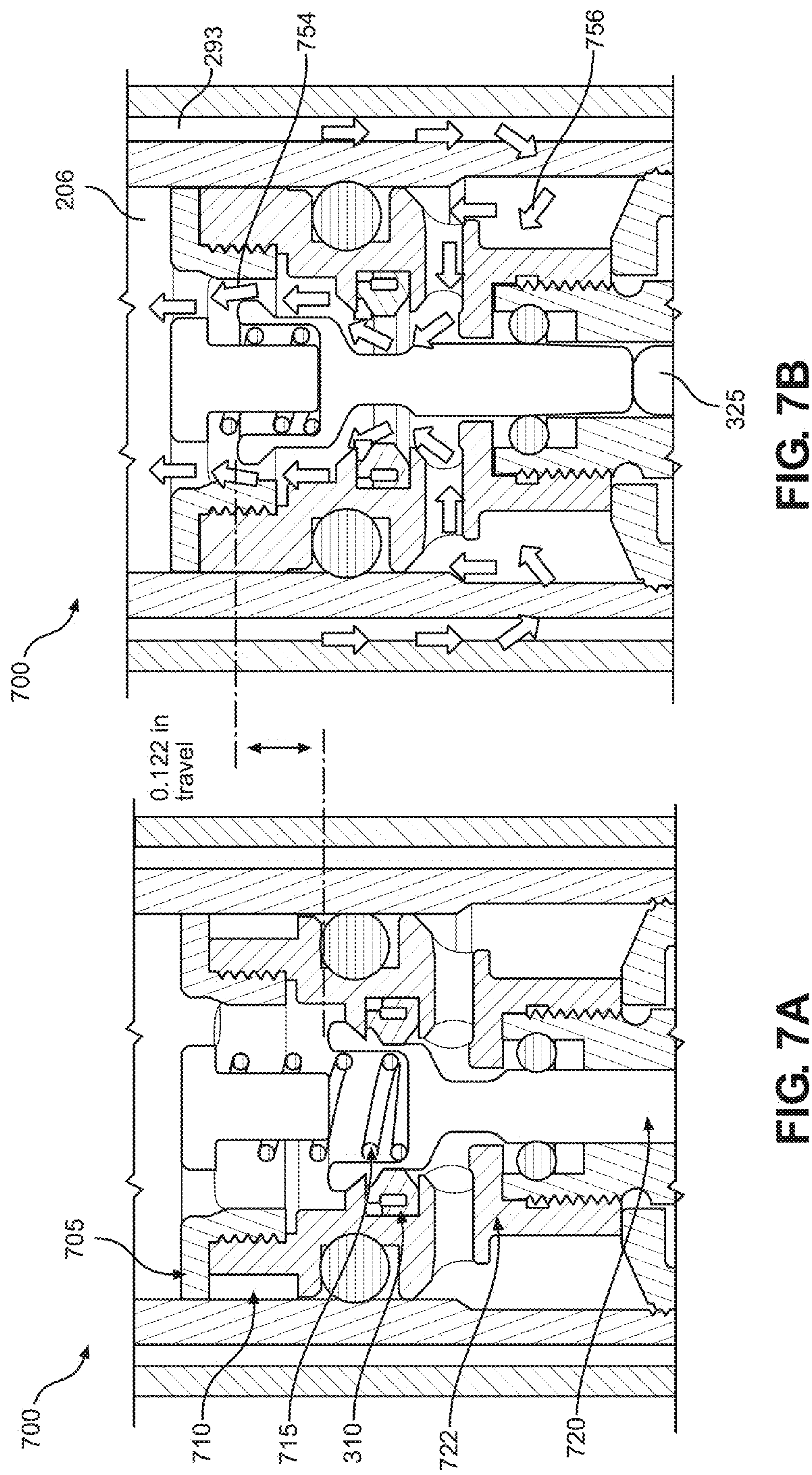
FIG. 7A is a section view of a piston having a closed valve, in accordance with an embodiment.
FIG. 7B is a section view of a piston having an open valve, in accordance with an embodiment.

With reference now to FIG. 7A, a piston 700 with the valve 720 in a closed configuration is shown in accordance with an embodiment. In one embodiment, piston 700 includes a body 722, a valve 720, a valve seal 310, valve spring 715, cap 705, and glide band 710. In one embodiment, adjuster rod 325 is used to open valve 720.

In one embodiment, the valve 720 is a poppet valve. However, it should be appreciated that in another embodiment, the valve may be another type of valve. The use of the poppet valve is provided as one embodiment and for purposes of clarity.

In one embodiment, valve spring 715 is used to provide the operating force to close valve 720. In one embodiment, cap 705 is threadedly coupled with body 722, such that the compression of valve spring 715 is adjustable by the tightening (or loosening) of cap 705 with respect to body 722.

With reference now to FIG. 7B, a piston 700 with the valve 720 in an open configuration is shown in accordance with an embodiment. For purposes of clarity, the components and/or functionality of FIG. 7B that are the same or similar to the components and/or functionality already described in FIG. 7A is not repeated, but instead the entirety of any components and/or functionality discussions provided herein is incorporated by reference.

In FIG. 7B, the valve 720 is in an open position such that flow path 754 is open. In one embodiment, chamber 206 includes port(s) 756 which allow fluid 208 to flow between chamber 206 and chamber 293.

Referring now to FIGS. 7A and 7B, when valve 720 is in the closed configuration, flow path(s) 754 are closed (or blocked) by valve 720. However, as shown in FIG. 7B, and in contrast to FIG. 7A, when the valve 720 is in an open position flow path 754 is no longer blocked by valve 720 and fluid 208 from chamber 206 and/or 293 can flow through flow path 754 and through port 756 as the telescopic assembly is being extended (or raised). In one embodiment, during the extension of the telescopic assembly fluid 208 will flow from chamber 293 through port 756 as shown by flow path 754 and into chamber 206.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments can be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What is claimed is:

1. A telescopic assembly comprising:

at least one upper tube;

at least one lower tube, wherein said at least one upper tube and said at least one lower tube are telescopically disposed with respect to each other to form at least one fluid chamber within said telescopic assembly; and a piston disposed at least partially within said fluid chamber and dividing said fluid chamber into a first portion and a second portion, said piston comprising:

a body with at least one fluid pathway therethrough, said at least one fluid pathway extends between said first portion and said second portion of said fluid chamber;

a valve slidably disposed at least partially within said body, wherein said valve is configured and disposed to control a fluid flow through said at least one fluid pathway; and a valve seal within a gland formed in said body, said valve seal providing a fluid seal between said body and said valve by said valve seal contacting both said body and said valve when said valve is in a closed position to prevent said fluid flow through said at least one fluid pathway, said valve seal comprising:

a stiff component; and a sealing material about said stiff component.

2. The telescopic assembly of claim 1 wherein said valve seal is shaped to retain said valve seal in said gland.

3. The telescopic assembly of claim 1 wherein said sealing material is over molded about said stiff component and directly into said gland to form said valve seal.

4. The telescopic assembly of claim 1 wherein said sealing material of said valve seal is formed into a shape wherein said valve seal has a cross-sectional profile with a geometric shape selected from the group consisting of: D-shaped, circular, rectangular, trapezoidal, and diamond-shaped.

5. The telescopic assembly of claim 1 wherein said stiff component is configured to retain said valve seal in said gland.

6. The telescopic assembly of claim 1 wherein said stiff component is formed of at least one material selected from the group consisting of: a metal alloy, steel, aluminum, titanium, ceramic, plastic, a composite material, and carbon fiber.

7. The telescopic assembly of claim 1 wherein said sealing material is at least one material selected from the group consisting of: a polymer, silicon, rubber, polytetrafluoroethylene (PTFE), an elastomer, and nitrile butadiene rubber (NBR).

8. The telescopic assembly of claim 1 wherein said gland is configured to retain said valve seal in said gland.

9. The telescopic assembly of claim 1 wherein said gland is formed of a plurality of body pieces, said valve seal constrained between said plurality of body pieces to retain said valve seal in said gland.

10. The telescopic assembly of claim 1 wherein said piston further comprises:

a pressure relief valve coupled with said body, said pressure relief valve providing a second fluid pathway between said first portion and said second portion of said fluid chamber, said pressure relief valve configured to limit a first pressure in said first portion from exceeding a second pressure in the second portion by more than a predefined value.

11. A piston comprising:

a body with at least one fluid pathway therethrough;

a valve slidably disposed at least partially within said body, wherein said valve is configured and disposed to control fluid flow through said at least one fluid pathway; and a valve seal within a gland formed in said body, said valve seal is configured to provide a fluid seal between said body and said valve by said valve seal contacting both said body and said valve when said valve is in a closed position to prevent said fluid flow through said at least one fluid pathway, said valve seal comprising:

a sealing material formed with a shape to retain said valve seal in said gland.

12. The piston of claim 11 wherein said sealing material of said valve seal is formed into a shape wherein said valve seal has a cross-sectional profile with a geometric shape selected from the group consisting of: D-shaped, circular, rectangular, trapezoidal, and diamond-shaped.

13. The piston of claim 11 wherein said valve seal further comprises:

a stiff component, said sealing material over molded about said stiff component to form said valve seal.

14. The piston of claim 13 wherein said sealing material is over molded about said stiff component and directly into said gland to form said valve seal.

15. The piston of claim 13 wherein said stiff component is configured to retain said valve seal in said gland.

16. The piston of claim 13 wherein said stiff component is formed of at least one material selected from the group consisting of: a metal alloy, steel, aluminum, titanium, plastic, ceramic, a composite material, and carbon fiber.

17. The piston of claim 13 wherein said sealing material is at least one of the materials selected from the group consisting of: polymer, silicon, rubber, polytetrafluoroethylene (PTFE), an elastomer, and nitrile butadiene rubber (NBR).

18. The piston of claim 11 wherein said gland is configured to retain said valve seal in said gland.

19. The piston of claim 11 wherein said gland is formed of a plurality of body pieces, said valve seal constrained between said plurality of body pieces to retain said valve seal in said gland.

* * * * *